Oct. 10, 1939.   A. H. LUHRMAN   2,175,943
PASTING MACHINE FOR BATTERY GRIDS
Filed March 23, 1936   4 Sheets-Sheet 1
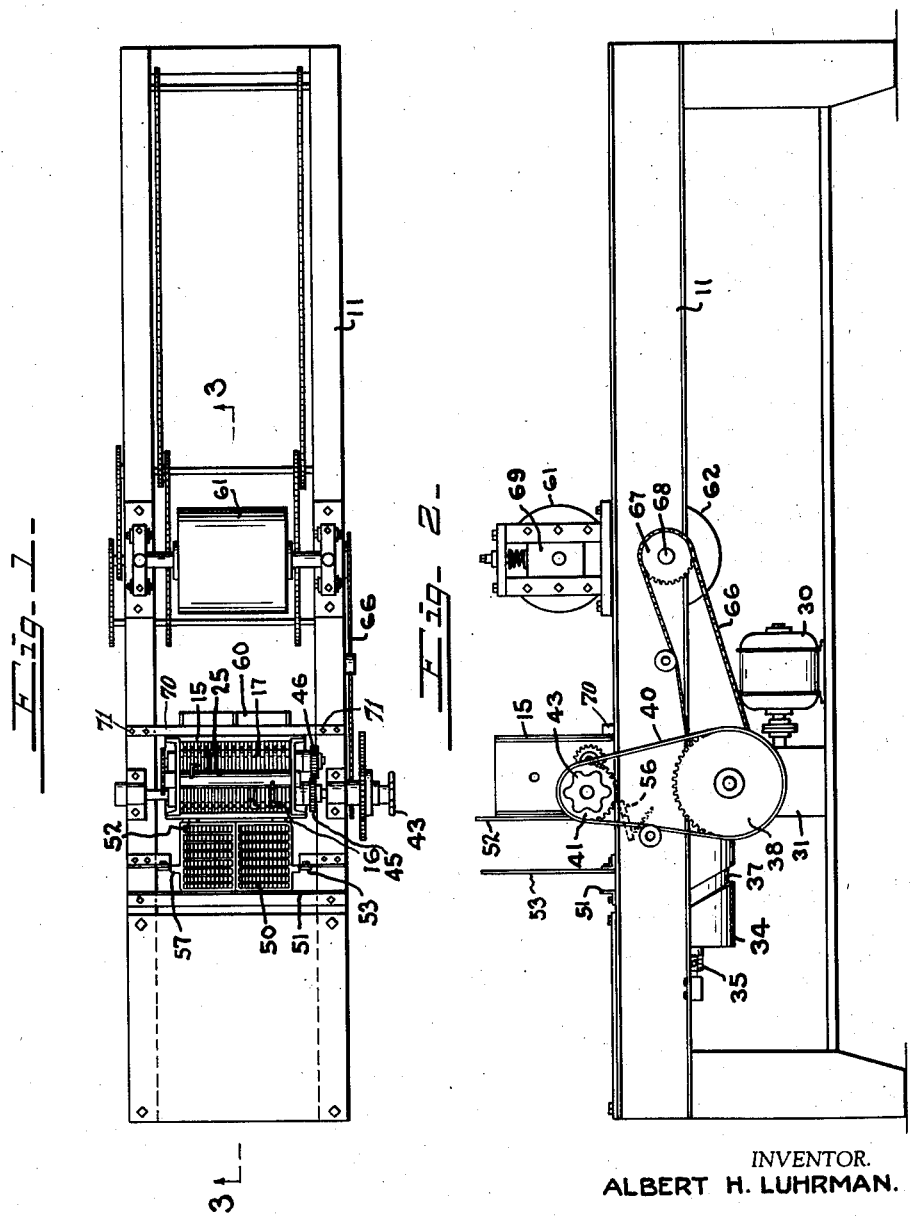
INVENTOR.
ALBERT H. LUHRMAN.
BY
ATTORNEY.

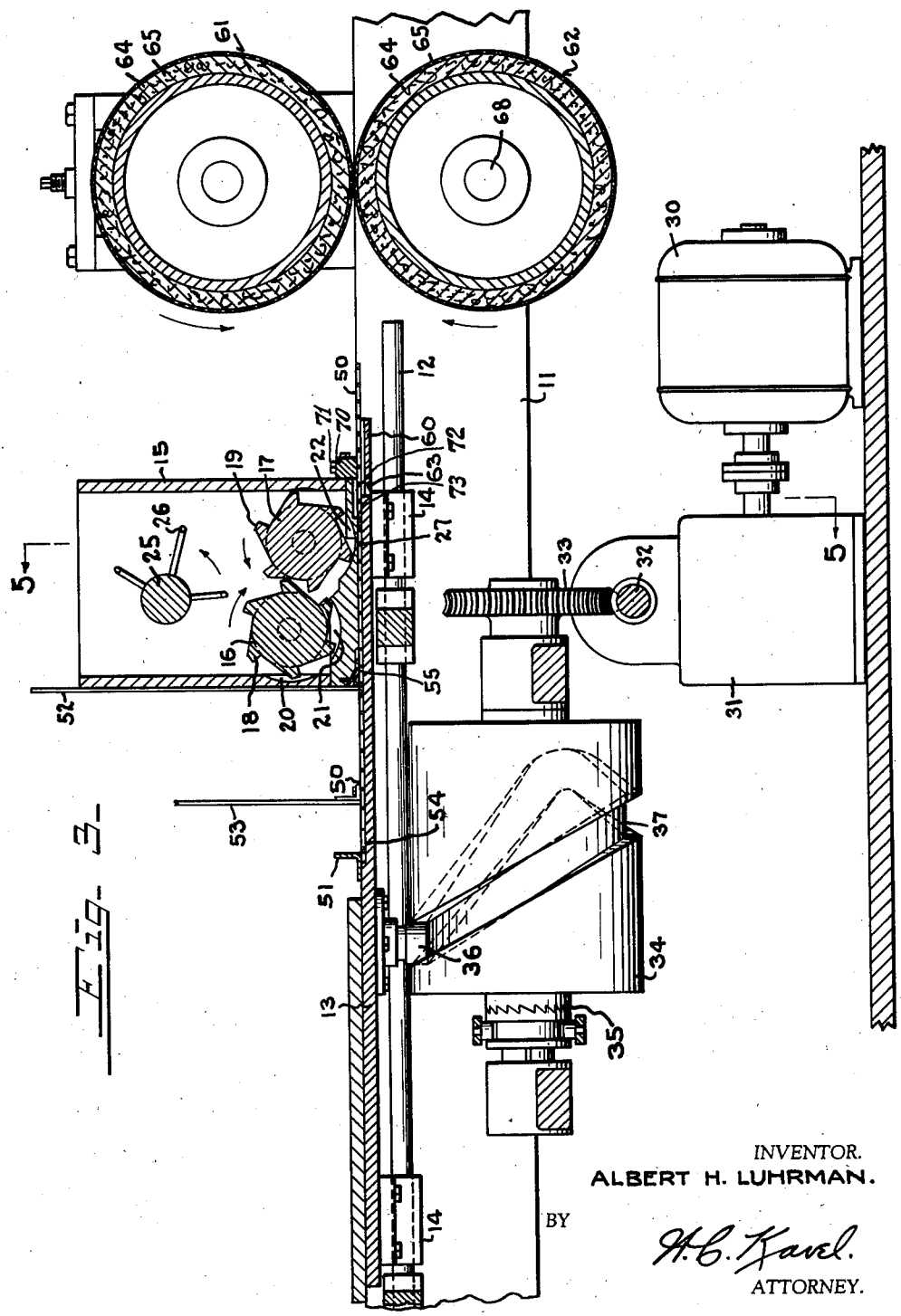

INVENTOR.
ALBERT H. LUHRMAN.

Oct. 10, 1939.   A. H. LUHRMAN   2,175,943
PASTING MACHINE FOR BATTERY GRIDS
Filed March 23, 1936   4 Sheets-Sheet 4

INVENTOR.
ALBERT H. LUHRMAN.
BY
*H.C. Kavel*
ATTORNEY.

Patented Oct. 10, 1939

2,175,943

UNITED STATES PATENT OFFICE 2,175,943

PASTING MACHINE FOR BATTERY GRIDS

Albert H. Luhrman, Cincinnati, Ohio

Application March 23, 1936, Serial No. 70,411

21 Claims. (Cl. 226—29)

My invention relates to improvements in means for applying a paste-like compound which forms the active components of a battery to battery grid plates and relates more particularly to the means for applying the paste to the grids without overpasting or a waste of materials.

It is desirable in machines of this character that they operate at a high speed and that the entire interstices of the grid plate be completely filled with the paste compound to a level equal to the thickness of the plate.

It is further desirable that this compound is pressed into the openings in the plate, as I have found that the greater the density of the active material the greater the capacity of the battery will be.

It is the object of my invention to provide a pasting machine having a reciprocating bed, the hopper above said bed containing the paste compound and means for feeding the grid plates past the hopper on said reciprocating bed.

A further object is to provide means for applying the paste to a small area at a time. A further object is to provide means within the hopper for creating a pressure on the paste being applied to the grid plate. A further object is to provide suitable conveying means in conjunction with the reciprocating bed to speedily convey grid plates through the machine. A further object is to provide automatic means for feeding the grid plates past the hopper.

A further object is to provide a definite pasting zone through which the grids pass.

My invention will be further readily understood from the following description and claims, and from the drawings, in which latter:

Fig. 1 is a plan view of the machine.

Fig. 2 is a side elevation of the same.

Fig. 3 is a longitudinal section of the same, taken in the plane of the line 3—3 of Fig. 1.

Figure 4:
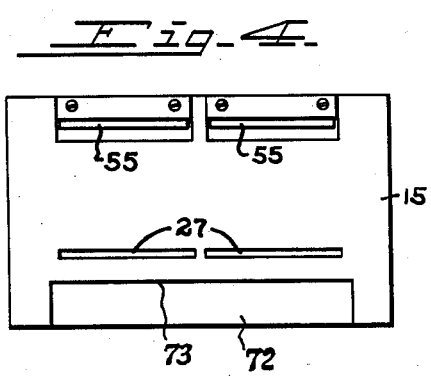
Fig. 4 is a bottom view of the hopper.
Figure 5:
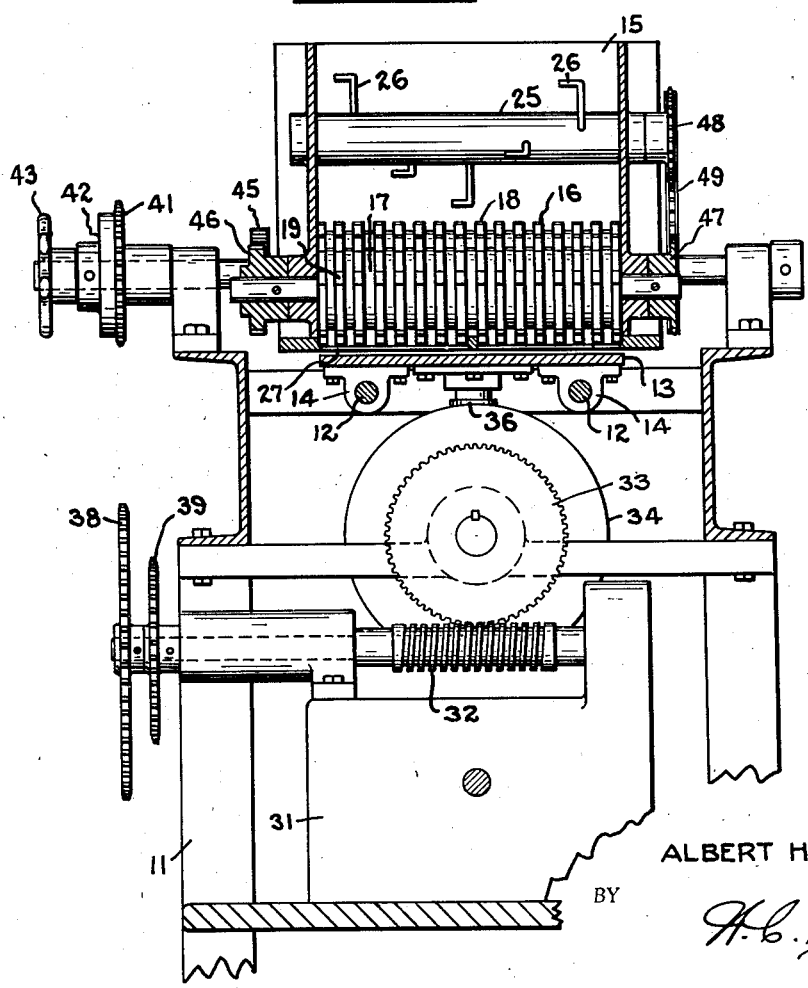
Fig. 5 is a vertical section, taken in the plane of the line 5—5 of Fig. 3.
Figure 6:
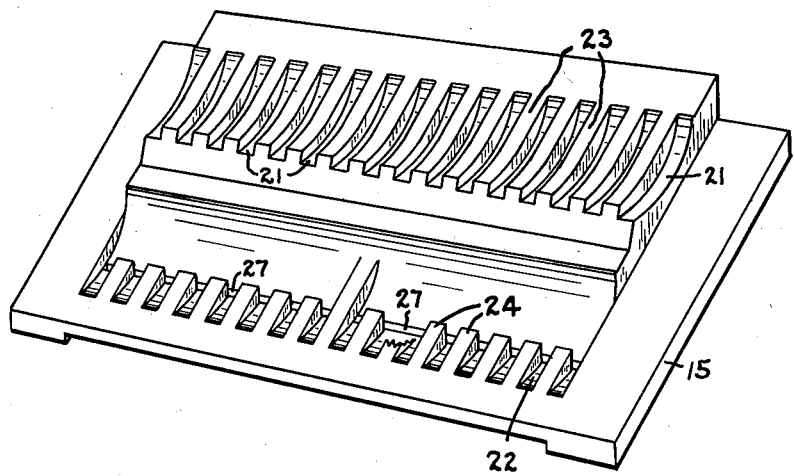
Fig. 6 is a perspective view of the bottom of the hopper.

My improved machine comprises a frame 11, having guide rods 12 suitably held thereon, on which a table 13 is reciprocated. The table 13 has bearings 14 about the rods 12. A hopper 15 is supported above the table 13 with sufficient clearance between the bottom of the hopper and the table to permit a grid plate to be forced therebetween. Within the hopper there are a pair of rolls 16 and 17 rotatable in opposite directions and being provided with a plurality of loosely intermeshing lugs or fingers 18 and 19 respectively and spaced apart throughout the entire length of each roll. Suitable grooves 20, 21 and 22 are provided in the inner faces of the hopper to permit the lugs or fingers to rotate while the ribs 23 and 24 formed between each set of grooves, act as scrapers on the sides of the fingers.

A suitable agitator 25 is mounted in the upper portion of the hopper and has a plurality of fingers 26 for the purpose of agitating or kneading the paste and forcing the paste down on to the rollers 16 and 17, whereby the paste will be carried by the fingers downward to the divided slot 27, which creates a pasting zone.

Suitable means is provided for driving the various mechanisms of the machine and comprises an electric motor 30, having driving connection with a gear reduction unit, shown generally at 31, which imparts power to a worm shaft 32, meshing with a worm wheel 33 for driving a drum cam 34.

A suitable clutch 35 is provided on the drum cam shaft to engage or disengage the driving power with the drum for causing the table to reciprocate or to remain stationary.

Extending downwardly from the table 13 is a roller guide 36, arranged to ride in the cam 37 on the drum 34. This cam is arranged to provide a regular slow forward motion to the table and a rapid return of the same which will be evidenced by the cam 37, having two-thirds of its periphery consisting of a forward motion and one-third for the return travel.

Secured to the shaft 32 are a pair of sprocket wheels 38, 39. Sprocket wheel 38 carries a chain 40 for forming a driving connection between said sprocket wheel and a sprocket wheel 41 having driving connection with the shaft of the roller 16, through a friction clutch 42, controlled by a hand wheel 43. A pair of spur gears 45 and 46 are secured to the respective shafts of the rollers 16 and 17 and mesh together to provide a related driving connection between the rollers. A sprocket wheel 47 is secured to the shaft of the roller 17 and a sprocket wheel 48 is secured to the extending shaft of the agitator 25 and a chain 49 is received about said sprocket wheels to impart rotation to the agitator.

The grid plates 50 are stacked in the rear of the hopper and are suitably positioned by means of guides 51, 52 and 53, and the table 13 is recessed as at 54, whereby upon its extreme rearward movement a plate will drop into said recess and as the table is moved forward, the plate will be forced below the hopper to a position entirely under the hopper. The table at this point returns rapidly to its starting position, but as it draws backward under the hopper the grid plate is maintained in position under the hopper by means of spring clips 55, which have a tendency to dig into the grid plate and prevent its rearward movement. This holding means is augmented by spring held fingers 56, contacting the projecting lugs 57 on the grid plate.

As the next plate drops into the recess 54 and the table is moved forward, this grid plate will push the preceding plate out from under the hopper and as this plate is moving below the slot 27, the paste will be forced into the interstices of the plate under pressure created by the rollers 16 and 17 driving the paste down into the slot. It will be noted that the slot in the bottom of the hopper is of a length sufficient to apply paste to the exposed faces within the border material of the grid plate. Thus as the plate is forced out from under the hopper, the edges of the plate will be entirely free from paste and only that portion of the plate which it was desired to apply paste to has been pasted.

As the carriage returns for the next cycle of movement, and as the plate is held stationary during this return movement, the lower face of the plate is wiped by the table, thus producing a grid plate with just the proper amount of paste applied thereto.

It will be noted that the hopper is supported on the shaft of the roller 16 and clamped at its forward end to the frame by means of the bar 70 and the bolts 71. The bottom of the hopper has a recess 72, the edge 73 of which is sharpened to form a finishing tool for scraping the upper surface of the pasted grid. As the grid passes under the edge 73 it is scraped to size. Thus with the wiping action of the table, the finished grids are all reduced to an exact thickness.

It will be noted, as shown in Fig. 3, that the plate after being pasted is held by a section of the hopper base and until the forward movement of the table takes place, at which time the plate will be moved forward with the table and will rest on the overhanging ledge 60 and be carried forward to the rolls 61 and 62. A slot 63 extends transversely of the table at the inner end of the reduced portion to permit particles wiped from the grid to fall through. The rolls are metal rollers, provided with a suitable padding 64, over which a suitable finishing surface 65, such as cheese cloth, is attached.

The lower roller 62 is suitably driven by a chain connection 66, with the sprocket 39 and a sprocket 67, mounted on the lower roller shaft 68. The upper roller 61 is mounted in a tension bearing 69, to provide tension between the rollers for removing the plates from the table and giving the grid a finished appearance. The grid is then carried on suitable conveyors preparatory to being removed from the machine.

Figure 7:
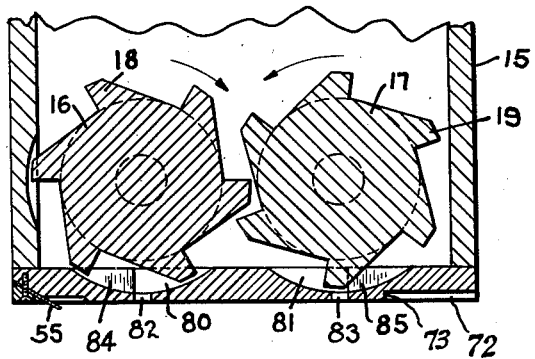
Fig. 7 is a detail section of a modified construction of the hopper.

In Fig. 7 a modified hopper base is shown, wherein the rollers 16 and 17 are both positioned adjacent to the bottom of the hopper and the fingers 18 and 19 push the paste into recesses 80 and 81 and through slots 82 and 83. Thus as the grid passes under the hopper the paste from the slot 82 will substantially fill the interstices of the grid, but any deficiency will be taken care of by the paste from slot 83, thereby assuring complete pasting of the grid. Ribs 84 and 85 wipe the fingers.

In the operation of my improved pasting machine the grids 50 are stacked in the rear of the hopper. The hopper is substantially filled with the paste forming the active material of the battery grid.

The clutch 35 is engaged, causing the cam drum 34 to rotate, thus feeding grid plates below the hopper. After a plate or two has been fed into the machine, the clutch 42 is engaged and the clutch 35 disengaged for working of the paste in the hopper without passing grid plates through the machine. After the paste has been conditioned the clutch 35 is reengaged and plates feed through the machine with the rollers 16 and 17 rotating and forcing paste through the slot in the base of the hopper into the pasting zone. Thus a grid plate will be below the hopper and the paste being forced therethrough will contact the grid plate and prevent a waste of paste. Thus on each forward stroke of the table a grid plate is pasted and held stationary during the return stroke of the table which also is a wiping stroke for wiping the opposite face of the grid plate to that exposed to the hopper.

The plates as they are pushed forward are picked up by the rollers 61 and 62 for further compressing the paste into the plate and as the plates leave the rollers they are carried by their extending lugs on suitable conveyors preparatory to being removed from the machine.

While I have shown one exemplification of my invention, it will be apparent that many changes may be made without departing from the scope of the appended claims.

Having thus fully described my invention, what I claim as new and desire to secure by Letters Patent, is:

1. In a pasting machine for applying paste to grid plates, a reciprocating support, a pasting zone, means on said support for moving said grid past said zone and means for holding said grid plate while said support wipes said pasted grid.

2. In a pasting machine for applying paste to a grid plate, a reciprocating support, a paste hopper, a pasting zone associated with said hopper, means on said support for moving said grid plate past said zone and means for holding said grid plate while said support wipes said grid plate during its return movement.

3. In a pasting machine for applying paste to a grid plate, a reciprocating support, a paste hopper, a pasting zone associated with said hopper, means for moving said grid past said zone and means for holding said grid plate while said support wipes said grid on the side opposite the pasting hopper.

4. In a pasting machine for applying paste to a grid plate, a movable support, a paste hopper, a pasting zone associated with said hopper, means for reciprocating said support past said pasting zone and means for removing said grid plate from said support.

5. In a pasting machine for grid plates, a frame, a reciprocating table having a forward and return stroke, a paste hopper mounted on said frame, the bottom of said hopper provided with a transverse restricted opening, means for feeding grids on said table below said hopper and means for holding said grid practically stationary during the return stroke of said table.

6. In a pasting machine for grid plates, a frame, a reciprocating table, a paste hopper associated with said table, a restricted transverse opening in said hopper, means for forcing paste through said opening, means on said table for feeding grid plates past said opening and means for holding said grid plate while said table wipes said plates after the paste has been applied thereto.

7. In a pasting machine for grid plates, a frame, a reciprocating table, a paste hopper associated with said table, a restricted transverse opening in said hopper, means for forcing paste through said opening, means on said table for feeding grid plates past said opening, means for holding said grid plates while said table wipes said plates after the paste has been applied thereto, a scraper on the forward end of said hopper for scraping the upper surface of the pasted grid and means for removing said plates from said table.

8. In a pasting machine for grid plates, a frame, a reciprocating table, a paste hopper associated with said table, a restricted transverse opening in said hopper, means for forcing paste through said opening, means on said table for feeding grid plates past said opening, said table forming a wiper for said plates after the paste has been applied thereto, and means for holding said plates stationary during said wiping action.

9. In a grid pasting machine, a hopper, a bottom for said hopper, a pair of rollers in said hopper having lugs intermeshing in said hopper, a transverse opening in said hopper for applying paste to grid plates and means for scraping said pasted grid plates.

10. In combination with a grid pasting machine, a hopper, a restricted grid pasting zone in said hopper, a pair of rollers, one of said rollers above said zone for forcing paste into said zone, one of said rollers being provided with circumferential grooves and means for passing grid plates past said zone.

11. In combination with a grid pasting machine, a hopper, means for passing grid plates past said hopper, a transverse pasting zone in said hopper, a pair of rollers in said hopper having a plurality of intermeshing lugs thereon for forcing paste into said zone and means above said rollers for agitating said paste.

12. A hopper for a grid pasting machine provided with a bottom wall, transverse restricted openings in said bottom wall forming a grid pasting zone, a rotatable member having circumferential grooves for carrying paste to said pasting zone and means for forcing paste from said rotatable member into said zone.

13. A hopper for a grid pasting machine, a restricted transverse opening in said hopper forming a grid pasting zone, a rotatable member in said hopper having circumferential grooves for carrying paste into said zone, a scraper on the base of said hopper and means for forcing paste from said grooves.

14. A hopper for a grid pasting machine, restricted transverse openings in said hopper forming a grid pasting zone, rotatable members in said hopper having extending lugs with circumferential grooves therebetween for carrying paste into said zone, and means for forcing said paste from said rotatable members into said zone.

15. A hopper for a grid pasting machine, transverse openings in the base of said hopper forming a grid pasting zone, rotatable members in said hopper having indentations for carrying paste into said zone, means in said hopper for moving paste into said indentations and means for forcing said paste from said rotatable members into said zone.

16. In a grid pasting machine, a reciprocating table, a horizontal pasting zone above said table, means for passing grids supported on said table past said zone and said zone limited to a portion of said grid area.

17. In a grid pasting machine, a reciprocating table, a horizontal pasting zone above said table, means for passing grids supported on said table past said zone and said zone limited to a relatively small portion of said grid area.

18. In a pasting machine for applying paste to a grid plate, a reciprocating support, a paste hopper, a pasting zone associated with said hopper, said support forming a base for said grid plate, means on said support for moving said grid plate past said zone and means for scraping the upper surface of said grid after passing said pasting zone.

19. In a pasting machine for grid plates, a frame, a reciprocating table, a paste hopper associated with said table, a restricted transverse opening in said hopper, means for forcing paste through said opening, means on said table for feeding grid plates past said opening, means for holding said grid plate stationary while said table wipes said plate after the paste has been applied thereto and means for scraping the upper surface of the pasted grid plate.

20. A hopper for a grid pasting machine provided with a bottom wall, an opening in said wall, a pair of rotating rollers above said opening, at least one of said rollers provided with circumferential grooves for carrying paste to said opening, and means for removing the paste from said grooves and forcing the paste into said opening.

21. A hopper for a grid pasting machine, a transverse opening in said hopper forming a grid pasting zone, a rotatable member in said hopper having projections thereon, circumferential grooves between said projections for carrying paste into said zone, and means for forcing the paste from said grooves into said zone.

ALBERT H. LUHRMAN.